(12) United States Patent
Wobben

(10) Patent No.: US 6,899,523 B2
(45) Date of Patent: May 31, 2005

(54) ROTOR BLADE FOR A WIND POWER INSTALLATION

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 257 days.

(21) Appl. No.: 10/168,934

(22) PCT Filed: Dec. 19, 2000

(86) PCT No.: PCT/EP00/12939
§ 371 (c)(1),
(2), (4) Date: Oct. 7, 2002

(87) PCT Pub. No.: WO01/48377
PCT Pub. Date: Jul. 5, 2001

(65) Prior Publication Data
US 2004/0115057 A1  Jun. 17, 2004

(30) Foreign Application Priority Data
Dec. 24, 1999 (DE) .......................... 199 63 086

(51) Int. Cl.[7] ................................................ F03D 1/02
(52) U.S. Cl. .............................. 416/132 B; 416/223 R; 416/243
(58) Field of Search ............................ 416/132 B, 228, 416/223 R, 243, 175, 203

(56) References Cited

U.S. PATENT DOCUMENTS

| | | | |
|---|---|---|---|
| 1,802,094 A | 4/1931 | Stuart | |
| 2,236,494 A | 3/1941 | Albers | 170/79 |
| 4,150,301 A | 4/1979 | Bergey, Jr. | 290/44 |
| 4,329,117 A | 5/1982 | Doman | 416/170 R |
| 4,495,423 A | 1/1985 | Rogers | 290/44 |

FOREIGN PATENT DOCUMENTS

| | | |
|---|---|---|
| DE | 819 078 | 10/1951 |
| DE | 31 26 677 A1 | 1/1983 |
| DE | 44 28 731 A1 | 2/1996 |
| DE | 44 28 730 A1 | 10/1996 |
| DE | 198 15 519 A1 | 10/1999 |
| EP | 0 675 285 A1 | 10/1995 |

*Primary Examiner*—Edward K. Look
*Assistant Examiner*—Dwayne J. White
(74) *Attorney, Agent, or Firm*—Seed IP Law Group PLLC

(57) ABSTRACT

The invention concerns a rotor blade for a wind power installation.

The degree of efficiency of rotor blades is determined by the afflux angle, that is to say the angle between the rotor blade profile chord and the afflux direction of the air. Particularly in the case of wind power installations the afflux angle depends on the rotor blade speed—that is to say the speed of rotation of the rotor—and the wind direction: the afflux direction is distinguished by the sum vector of the wind speed $v_{Wind}$ and the speed of the rotor blade tip $v_{Tip}$, the effective afflux speed $v_{eff}$, see FIG. 1, $$v_{eff} = \sqrt{v_{Wind}^2 + v_{Tip}^2} \qquad (1)$$

The object of the invention is therefore that of reducing the sensitivity of a rotor blade to turbulent wind flows.

A rotor blade for a wind power installation which is divided in its longitudinal direction into at least two portions which are integrally connected together and which are designed for different high-speed indexes, wherein the high-speed index, associated with the maximum power coefficient, of the portion which is further away from the rotor blade root is greater than the high-speed index, associated with the maximum power coefficient, of the portion respectively disposed closer to the rotor blade root.

14 Claims, 4 Drawing Sheets

ROTOR BLADE FOR A WIND POWER INSTALLATION

The invention concerns a rotor blade for a wind power installation.

The degree of efficiency of rotor blades is determined by the afflux angle, that is to say the angle between the rotor blade profile chord and the afflux direction of the air. Particularly in the case of wind power installations the afflux angle depends on the rotor blade speed—that is to say the speed of rotation of the rotor—and the wind direction: the afflux direction is distinguished by the sum vector of the wind speed $v_{Wind}$ and the speed of the rotor blade tip $v_{Tip}$, the effective afflux speed $v_{\mathit{eff}}$, see FIG. 1, $$v_{\mathit{eff}} = \sqrt{v_{Wind}^2 + v_{Tip}^2} \tag{1}$$

If the wind speed changes, the afflux angle also changes with the speed of rotation of the rotor remaining the same and with the angle of attack of the rotor blade remaining the same. That causes a change in the lift force which acts on the rotor blade and thus ultimately a change in the level of efficiency of the rotor. With an afflux angle of 0°, that is to say therefore with a comparatively low wind speed, the lift is very low. In the range of small afflux angles, the level of efficiency then initially rises slowly with the wind speed, to a maximum level of efficiency. If the wind speed rises still further, the afflux angle increases to a value from which the flow breaks away on the rotor blade suction side, being the side of the rotor blade which is away from the wind. The level of efficiency drops away steeply from then on, with an increasing wind speed. That is referred to as the stall region.

Figure 2:
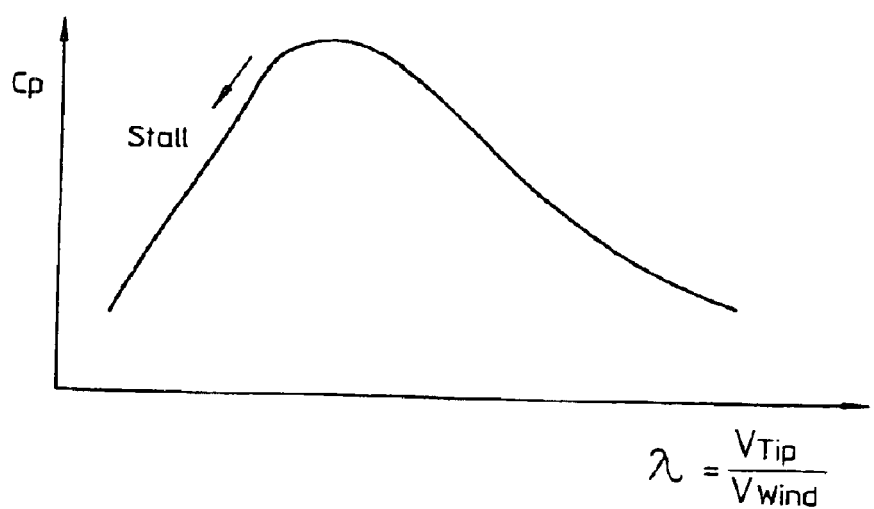

To illustrate that relationship, FIG. 2 shows the power coefficient $c_p$ of a rotor blade as a function of the high-speed index $\lambda$, $$\lambda = v_{Tip}/v_{Wind} \tag{2}$$

The high-speed index is formed in accordance with equation 2 from the ratio of the rotor blade speed at the blade tip $v_{Tip}$ to the prevailing wind speed $v_{Wind}$ and therefore, in a first approximation, that is to say with a relatively small afflux angle, is inversely proportional to the afflux angle. The power coefficient $c_p$ is proportional to the efficiency of the rotor blade.

FIG. 2 shows that, with a falling high-speed index the power coefficient $c_p$ initially rises and, after going beyond a maximum, falls away steeply. In addition, although this is not shown in FIG. 2, the power coefficient is also dependent on the angle of attack of the rotor blade as the afflux angle also changes with the angle of attack. For an optimum power yield, the angle of attack selected for the rotor blade would be such that the wind power installation, with a given rotor blade and wind speed, operates on the maximum of the $c_p$-curve.

In most areas however it is not possible to reckon on a constant wind speed. Changing winds involve a change in the high-speed index, with a constant speed of rotation of the rotor. As however during operation of a wind power installation, a power coefficient which is as high as possible is to be achieved even with changing winds, hitherto the speed of rotation of the rotor of the wind power installation was regulated linearly in accordance with the wind speed on the basis of the principle of the variable speed of rotation, so that the high-speed index remains constant as far as possible, and the rotor blade is always operated close to the maximum power coefficient. That concept functions very well at locations involving low levels of turbulence.

When the wind is very gusty and squally however tracking adjustment of the speed of rotor rotation is not possible in respect of the corresponding speed and/or accuracy: with rapid and major fluctuations in the wind speed about a mean value, the speed of rotation of the rotor is often unable to follow that directly and immediately. As a result, particularly when there is a rapid rise in the wind speed, the afflux angle becomes briefly too great. At that moment, the flow on the suction side of the rotor blade breaks down, whereby consequently it experiences no lift or at best only a greatly reduced amount of lift. Accordingly, the torque applied to the rotor also immediately falls, with the result that the speed of rotation additionally drops. That effect is self-increasing as now the afflux angle is in turn even greater, and so forth.

A similar problem arises at locations with locally low levels of turbulence. If the wind speed changes for example only on the right-hand area of the circle of the rotor, the flow at the rotor blade which at that time is in the region of such turbulence breaks down. In such a situation a variable rotary speed also cannot provide any remedy.

DE 198 15 519 discloses a rotor blade for a wind power installation which operates on the passive stall or active stall principle, wherein the rotor blade has a particular profile leading edge.

DE 44 28 731 discloses a variable-length rotor blade for wind power installations, which at least in a portion thereof is in the form of a telescope arrangement with a rigid telescope portion and a movable telescope portion.

DE 44 28 730 discloses a metal rotor blade for wind power installations, formed from a load-bearing hollow profile which extends over the entire length of the rotor blade and which tapers towards the blade tip and which is composed of two leg plates and two curved flange plates, wherein the flange plates at the same time form the desired surface contour of the rotor blade in the region of the hollow profile.

DE 31 26 677 discloses a rotor blade for high-speed rotors. In that case the blade tip region is in the form of a separate rotor blade portion and is connected to the rotor blade by way of a pivot axis in such a way that the rotor blade portion is adjustable by wind forces.

Finally EP 0 675 285 discloses a rotor blade vane for wind power installations, wherein the rotor blade is equipped with a varying number of foils in order to ensure maximum possible roughness.

In order as far as possible not to go into the stall range in operation of a wind power installation when the wind is gusty or squally, the speed of rotor rotation is generally regulated in such a way that the wind power installation—based on a mean wind speed—is operated at a high-speed index which is somewhat above the high-speed index which is associated with the maximum value of the power coefficient (see FIG. 2). As a result, in the event of wind which freshens suddenly but not too greatly, the power coefficient even initially increases. In the event of a strong and sudden increase in wind however, the maximum in the level of efficiency is still exceeded, and the flow begins to break down. This means that the problem is accordingly still not satisfactorily resolved. A further disadvantage which has been found is that the power yield is not at a maximum, by virtue of the selected rotational speed.

Therefore the object of the present invention is to reduce the sensitivity of a rotor blade to turbulent wind flows.

That object is attained by a rotor blade having the features of claim 1. Advantageous developments are set forth in the appendant claims.

If the process of flow breakdown is considered more closely, it is found that, in the case of the known rotor blades, it takes place by always beginning in the region close to the centre, near the rotor blade root, and spreading outwardly to the rotor blade tip. It is therefore desirable on the one hand to avoid flow breakdown in particular in the region of the rotor blade, which is near the centre. In accordance with the invention that is achieved in that the rotor blade is divided in its longitudinal direction into at least two integrally interconnected portions which are designed for different high-speed indexes, wherein the high-speed index, associated with the maximum power coefficient, of the portion which is further away from the rotor blade root is greater than the high-power index, associated with the maximum power coefficient, of the portion which is respectively closer to the rotor blade root.

The outer end of the rotor blade is crucial in terms of energy production, by virtue of the greater torque, due to the forces acting there and the profile configuration of a rotor blade, which is governed by considerations of stability. It is therefore further desirable, if a flow breakdown cannot be completely avoided, to limit that to the inner region which is near the rotor blade root. That is preferably achieved if the transition between the respectively adjacent portions is comparatively short in comparison with the length of the portions so that a flow breakdown which begins at the inner part is stopped at the transition and therefore cannot be propagated over the entire length of the rotor blade and thus in particular cannot spread to the rotor blade tip.

Preferably, for that purpose, the transition selected involves between 1% and 30% of the length of one of the individual portions. The intermediate angle of the two portions can be between 5° and 20° in an advantageous embodiment. In that way, depending on the respective wind conditions, on the one hand advantageous afflux angles are achieved both at the inner rotor blade portion and also at the outer rotor blade portion. On the other hand, the transition is sufficiently abrupt to prevent propagation of a flow breakdown which nonetheless begins.

It is further found to be advantageous for the rotor blade to be subdivided into a longer inner portion and a shorter outer portion in order very substantially to prevent flow breakdown and at the same time not to unnecessarily reduce the level of efficiency of the rotor blade.

Figure 1:
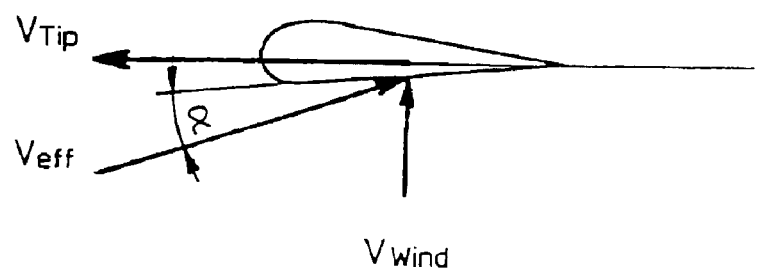
Figure 3:
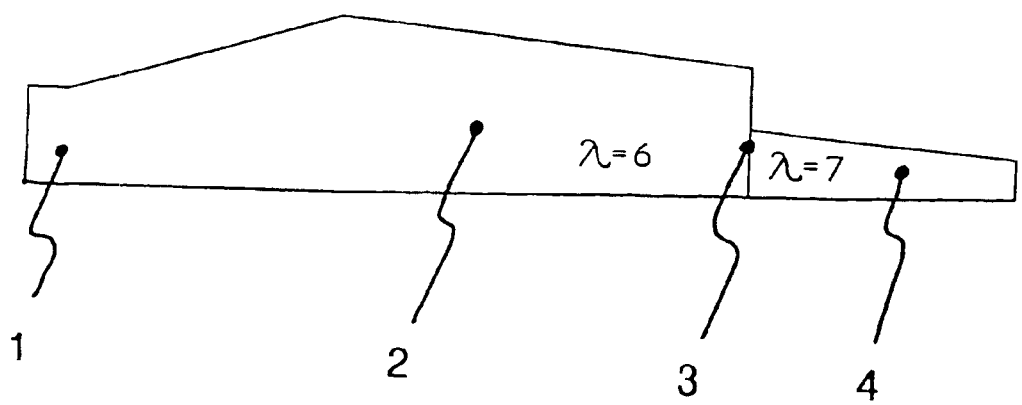
Figure 4:
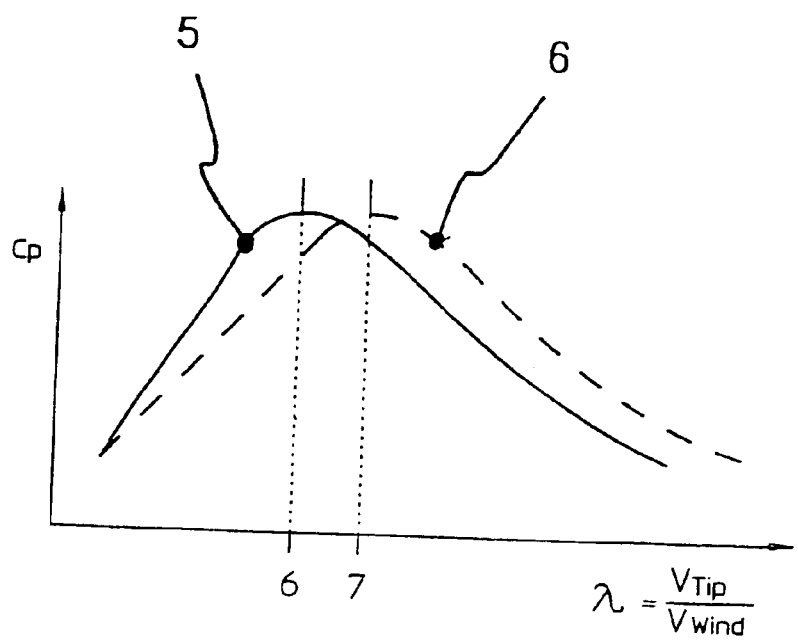
Figure 5:
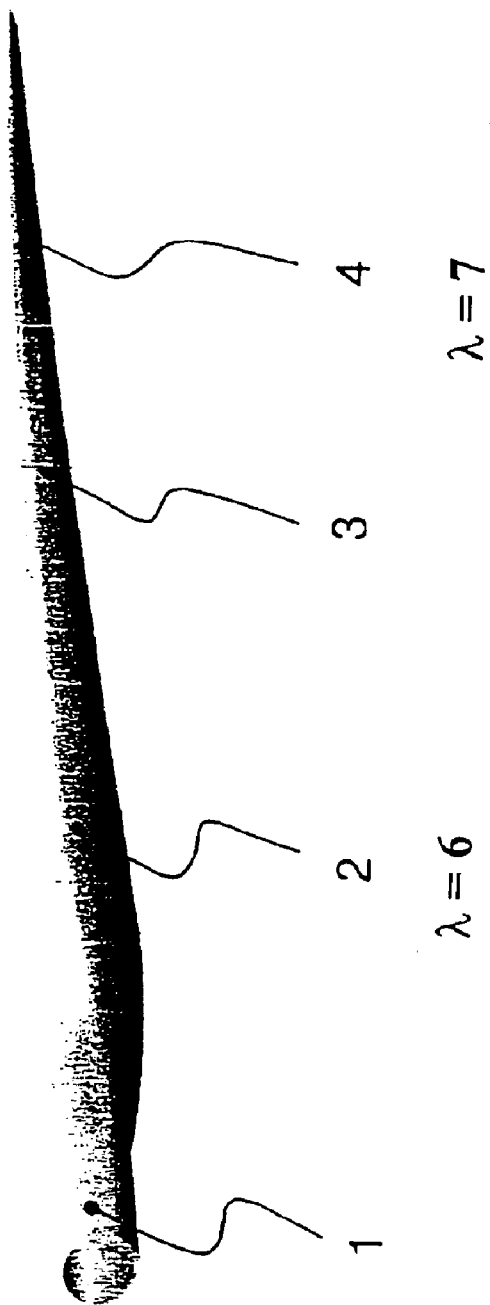
Figure 6:
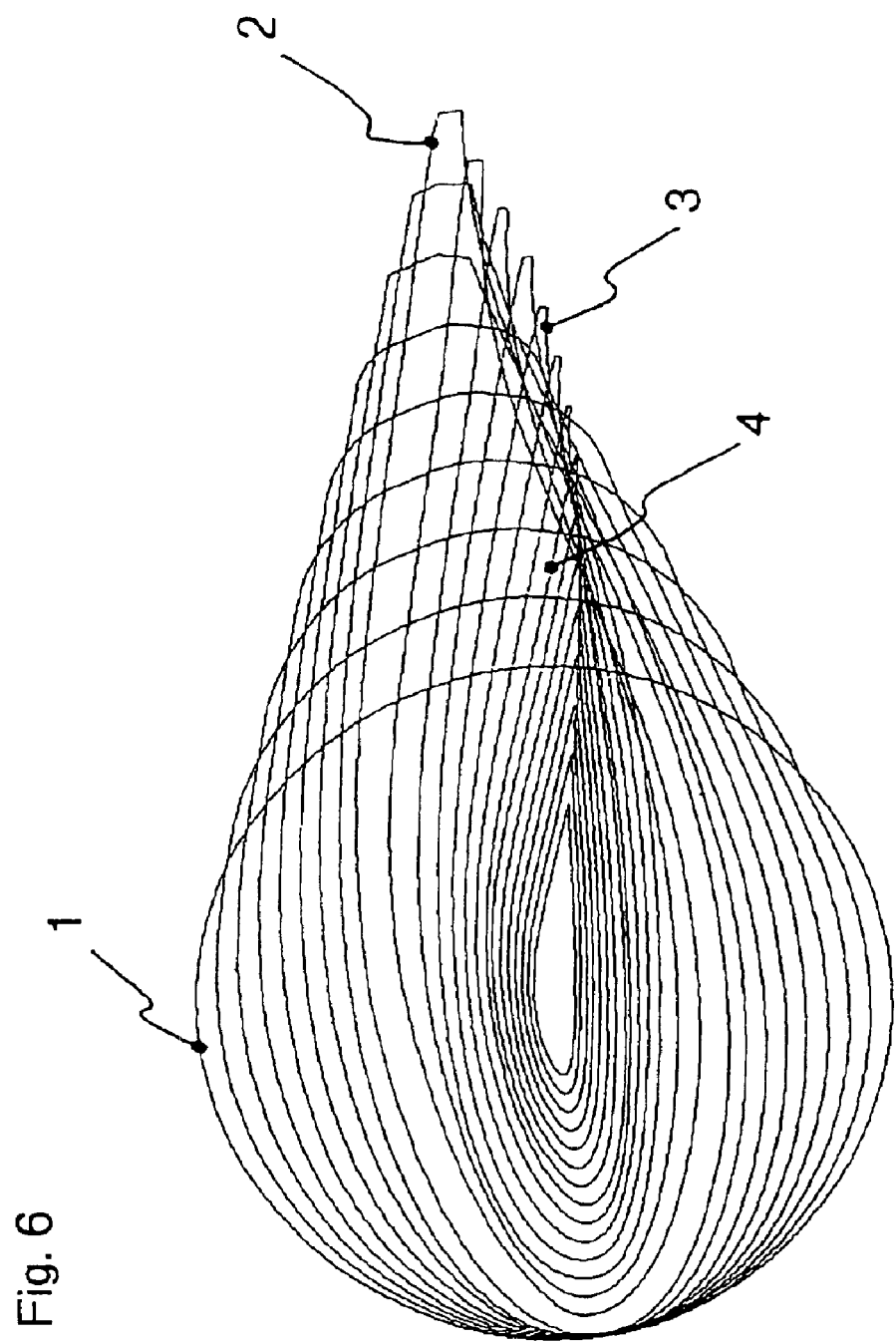

The invention is described by way of example hereinafter with reference to the drawings in which:

FIG. 1 shows a profile section of a rotor blade,

FIG. 2 shows the rotor blade power coefficient $c_p$ in dependence on the high-speed index $\lambda$, FIG. 3 shows an embodiment by way of example of a two-part, integral rotor blade of which the two portions are designed for different high-speed indexes, FIG. 4 shows the power coefficient curves $c_p$ of two rotor blade portions of a rotor blade in dependence on the high-speed index $\lambda$, FIG. 5 shows a three-dimensional view of a rotor blade with two different rotor blade portions, and FIG. 6 shows a stringer view: superimposed profile sections of a rotor blade from the rotor blade root to the rotor blade tip.

The profile section of the rotor blade in the region of the outer rotor blade portion as shown in FIG. 1 clearly illustrates the relationship between the rotor blade speed at the rotor blade tip $v_{Tip}$, the wind speed $v_{Wind}$ and the resulting afflux angle $\alpha$. In accordance with equation 1 the effective afflux speed $v_{eff}$ is additively composed of the component of the wind speed and the rotor blade speed which is perpendicular thereto. With an increasing wind speed the component thereof increases and the afflux angle a becomes greater.

In comparison the high-speed index $\lambda$ decreases with an increasing wind speed. As shown in FIG. 2, in that case we move on the power coefficient curve from right to left, pass over the maximum of the power coefficient at a location and, with the high-speed index decreasing further, go into the stall region in which the power coefficient falls greatly.

The rotor blade shown in the embodiment of FIG. 3 comprises a rotor blade root 1 and two rotor blade portions 2 and 4, the transition 3 of which is short as measured in relation to the length of the rotor blade portions 2 and 4 and is only diagrammatically illustrated by a separating line. The larger portion 2 involves a smaller angle of attack between the profile chord of the rotor blade portion and the wind direction whereby the power coefficient maximum of that portion occurs at a lower high-speed index $\lambda$ (=6). That portion is therefore designed for a lower high-speed index. That therefore takes account of the shorter orbital distance which the inner region has to cover during one revolution. The smaller rotor blade portion 4 with a greater angle of attack between the profile chord of the rotor blade portion and the wind direction in contrast reaches its power coefficient maximum at a greater high-speed index $\lambda$ (=7).

The variation in the two power coefficients $c_p$ in dependence on the high-speed index $\lambda$ is shown in FIG. 4 for the rotor blade portion 2 of FIG. 3 in the form of a solid line 5 and for the rotor blade portion 4 in FIG. 3 in the form of a broken line 6.

In normal operation (with $\lambda$=7) accordingly the outer (tip) region of the rotor blade is operated at its optimum as this is also relevant in regard to the total production of the wind power installation. The inner region ($\lambda$=6) is to the left of the optimum so that gusts of wind do not mean that the entire blade is taken into the stall region. If now a strong gust (positive gust) occurs, the outer region ($\lambda$=7) possibly begins to transfer into the stall region (it begins to stall) while then the inner region ($\lambda$=6) is operated at the optimum. The result of this is that a stall, if it occurs at all, can only ever occur in a small region of the entire rotor blade, so that the result is so-to-speak a 'widened' characteristic (FIG. 4). That can also be explained in the following terms:

If the wind speed increases and thus the high-speed index decreases, then in the case of a relatively small angle of attack as in the case of the inner rotor blade portion, the blade goes into the stall region only comparatively late, that is to say only with a relatively low high-speed index $\lambda$=6, compared to an angle of attack as at the outer region $\lambda$=7. To sum up, this means that the speed of rotor rotation does not decrease so quickly, but reaches a stable operating point. The division therefore provides an apparently widened power coefficient characteristic curve, in dependence on the high-speed index.

The rotor blade in FIG. 5 illustrates another embodiment in which the transitional region 3 between the two rotor blade portions 2 and 4 which are identified by the arrows is comparatively large, that is to say, involves a more homogeneous configuration than in the embodiment of FIG. 3, and as a result is not of striking appearance. The front portion with the round profile 1 is the rotor blade root.

The superimposed profile sections in FIG. 6 reproduce the profile configuration of a rotor blade in various portions. Beginning at the rotor blade root 1, the profile is round, then progressively adopts a drop shape towards the tip in the inner rotor blade portion 2 and initially faces slightly upwardly with the narrow side. Progressing further in the direction of the rotor blade tip, the profile tilts downwardly with the narrow side in the transitional region 3 until the profile chord is on the horizontal, whereby the angle of attack is increased. It is at that location that the outer rotor blade portion 4 begins, which is characterised progressively to the tip by the horizontal profile chord configuration and a decreasing cross-section. The illustration shows the more homogeneous transition of the embodiment as in FIG. 5, which extends over a comparatively greater portion of the rotor blade.

What is claimed is:

1. A rotor blade for a wind power installation, the rotor blade divided longitudinally into at least two integrally connected portions, the rotor blade comprising:

a first one of the portions being closer to a root of the rotor blade and a second one of the portions being farther from the root of the rotor blade;

the first portion having a first angle of attack so that a power coefficient of the first portion is maximized at a first high-speed index with a first wind velocity, a second portion of the rotor having a second angle of attack, different from the first angle of attack, so that a power coefficient of the second portion is maximized at a second high-speed index with a second wind velocity, wherein the second high-speed index is greater than the first high speed index, and the first wind velocity is greater than the second wind velocity.

2. The rotor blade according to claim 1, further comprising:

a transition region formed between the first portion and the second portion, the transition region being comparatively short in relationship to the respective lengths of the portions.

3. The rotor blade according to claim 2 wherein the length of the transition region is about 1%–30% of the length of one of either the first portion or the second portion.

4. The rotor blade according to claim 1, further comprising:

an intermediate angle formed in the transition region, the intermediate angle being in the range of about 5° to 20°.

5. A rotor blade for a wind power installation which is divided in its longitudinal direction into at least two portions which are integrally connected together and which are designed for different high-speed indexes, wherein the high-speed index, associated with the maximum power coefficient, of the portion which is further away from the rotor blade root is greater than the high-speed index, associated with the maximum power coefficient, of the portion respectively disposed closer to the rotor blade root, wherein the rotor blade is divided into a longer, inner portion and a shorter, outer portion.

6. The rotor blade according to claim 1 wherein the rotor blade is rotatably mounted as a whole about its longitudinal axis.

7. The rotor blade according to claim 1 wherein a pitch angle of the rotor blade is actively controllable while the rotor blade is rotating.

8. A monolithic rotor blade for a wind power installation, the rotor blade comprising:

an outer portion of the rotor blade distally located from a root of the rotor blade, the outer portion having a first angle of attack that permits the rotor blade to operate substantially within a first range of optimum power when the rotor blade is subjected to a first wind velocity;

an inner portion of the rotor blade extending from the root of the rotor blade and integrally connected to the outer portion, the inner portion having a second angle of attack that permits the rotor blade to operate substantially within a second range of optimum power when the first wind velocity is increased to a second wind velocity; and a transition region defined by where the outer portion integrally connects to the inner portion.

9. The rotor blade according to claim 8 wherein the transition region is sufficiently abrupt to substantially reduce a turbulent wind flow condition on one portion of the rotor blade from propagating to the other portion of the rotor blade.

10. The rotor blade according to claim 8 wherein the outer portion integrally connects to the inner portion includes the outer portion directly connected to the inner portion to form a continuous rotor blade.

11. The rotor blade according to claim 8 wherein the transition region is homogenous.

12. The rotor blade according to claim 8 wherein the length of the transition region is about 1%–30% of the length of one of either the inner portion or the outer portion.

13. The rotor blade according to claim 8, further comprising:

an intermediate angle formed in the transition region, the intermediate angle being in the range of about 5° to 20°.

14. The rotor blade according to claim 8 wherein the inner portion of the rotor blade is longer than the outer portion of the rotor blade.

* * * * *